March 1, 1960  A. W. GAUBATZ  2,926,899
COUNTERBALANCED SPEED SWITCH
Filed Oct. 27, 1958  2 Sheets-Sheet 1

INVENTOR.
Arthur W. Gaubatz
BY
R. R. Barnard
ATTORNEY

March 1, 1960 A. W. GAUBATZ 2,926,899
COUNTERBALANCED SPEED SWITCH
Filed Oct. 27, 1958 2 Sheets-Sheet 2

INVENTOR.
Arthur W. Gaubatz
BY
R. R. Barnard
ATTORNEY

United States Patent Office 2,926,899
Patented Mar. 1, 1960

2,926,899

COUNTERBALANCED SPEED SWITCH

Arthur W. Gaubatz, Indianapolis, Ind., assignor to General Motors Corporation, Detroit, Mich., a corporation of Delaware Application October 27, 1958, Serial No. 769,701

6 Claims. (Cl. 264—1)

This invention relates to control apparatus, and more particularly to a centrifugal governor wherein a plurality of electrical switches or other control elements are actuated sequentially at predetermined speeds of rotation of an engine or other rotating agency.

The invention employs a construction wherein centrifugally actuated flyweights are revolved by a rotating shaft to transmit an axial thrust to adjust the position of an axially movable non-rotatable sleeve member. The sleeve member is provided with a cam surface or member for sequential engagement with a plurality of axially staggered microswitches or equivalent control elements and is also provided with a step surface for sequential engagement with a plurality of concentric non-rotating balance springs which individually determine the cut-in points of the microswitches.

The combined mass of the speed movable sleeve and switch actuating cam member is such that axial vibrations of the engine have tended to shift this mass and to affect the operation of the microswitches. In this way the devices controlled by the microswitches are adversely affected frequently with serious consequences.

The present invention relates to a device adapted to offset vibration induced inertia forces tending to modify the normal operation of a speed switch mechanism of the type shown in Patent 2,786,667 Gaubatz. Specifically the present invention includes a counterweighted lever suitably articulated to the axially movable part of the switch mechanism to counteract the vibration induced movement of the switch actuating mechanism.

The details as well as other objects and advantages of the present invention will be apparent from a perusal of the detailed description which follows and a preferred embodiment of which is shown in the drawings.

Figure 1:
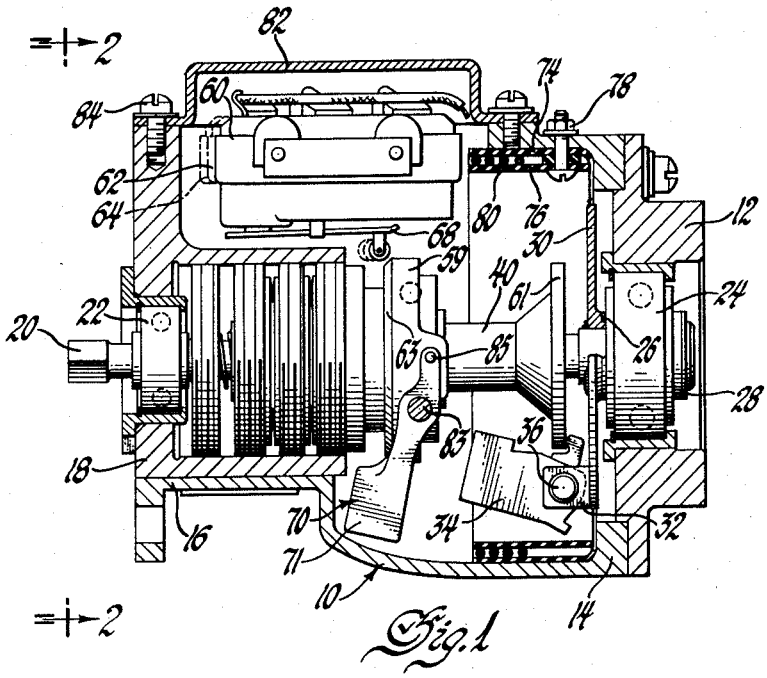
Figure 1 shows a control apparatus embodying the subject invention.

Referring now to the drawings, the governor assembly includes a housing 10 and a centrally apertured end cover 12 detachably secured thereto. The housing 10 has several substantially circular sections along its length including an enlarged portion 14 and a reduced portion 16 having a centrally apertured flange 18 by which the housing is mounted on an engine or other rotation imparting device. The governor shaft 20 may be driven from either of its ends and is supported for rotation in the housing by ball bearings 22 and 24.

The shaft 20 is secured against axial shifting by the cooperation of a shoulder 26 and a C-ring 28 with the inner race of the bearing 24. An annular flange 30 on the shaft carries three clevis-like mounting brackets 32 each formed by a pair of adjacent arms. Each bracket 32 carries a pivotable flyweight 34 on a transverse pin 36.

An axially shiftable sleeve 40 is coaxially spaced with the governor shaft 20 and slidably supported thereon by ball bearing sets 41. Bearing sets 41 are suitably retained in a cage 45 which is loosely disposed between sleeve 40 and shaft 20. Cage 45 may move axially relatively to the sleeve and shaft to the extent determined by the snap rings 47 and 49 mounted in sleeve 40.

A shoulder 51 is formed on sleeve 40 and against which an inner race 53 of bearing 55 is adapted to abut. Outer race 57 of bearing 55 peripherally supports a switch actuating member 59 thereon.

The other end of sleeve 40 has a flange 61 formed thereon and adapted to be engaged by flyweights 34 in a manner subsequently to be considered. It is to be noted that flyweight fulcrum 36 is generally radially outwardly spaced from sleeve flange 61.

A plurality of control elements such as the conventional microswitches 60, 62 and 64 are secured in the housing 10 by suitable means as by the screws 66. The switches are relatively displaced axially of the sleeve 40 as may be seen by their dotted out-of-position outlines in Figure 1. The switch actuating arms 68 of the switches are actuated in succession by the axial movement of the disk-like member 59 supported upon sleeve 40. The microswitches may be arranged to complete separate electrical control circuits on engagement or disengagement of member 59, as desired. In the illustrated embodiment of the invention, each of the microswitches is a single-pole double-throw type which completes a separate electrical circuit when its actuating arm is displaced radially outward by engagement with the member 59.

The external wiring connections to the switches are brought in through a conventional plug connector 72 detachably mounted on the housing 10. A pair of spaced concentric cylindrical insulators 74 and 76 are secured in the housing by bolts 78 and form an annular distribution chamber for the internal wiring harness 80 of the switches. Cover plates 82 detachably secured to the housing 10 by bolts 84 provide access to the microswitches.

The microswitches 60, 62 and 64 are, respectively, low speed, intermediate speed and high speed switches adapted to be actuated at speeds set by the individual adjustment of their respective balance springs, for example, at shaft speeds of 2,000, 3,000 and 4,000 r.p.m. Axial movement of the sleeve 40 by the flyweights 34 is yieldably opposed in successive increments by a low speed balance spring 90, an intermediate speed balance spring 92, and a high speed balance spring 94. The balance springs are concentrically arranged around the governor shaft 20. Spring 90 is retained at one end by member 59, spring 92 by an annular flange 96 on sleeve 98 and spring 94 by an annular ring 100. The balance springs are respectively supported at their other ends by the axially spaced adjusting collars 102, 104 and 106. The adjusting collars are individually shiftable axially as shown and described in the aforenoted Gaubatz patent and the balance springs adjustably preloaded thereby.

Intermediate and high speed springs 92 and 94 are preferably of the Belleville type in order to provide snap actuation to switches 62 and 64. This type of switch actuation is possible since there is less deflection during load build-up with the Belleville type springs. Surface 63 of flange 59 will engage the actuating arm of the low speed microswitch 60. The sleeve 40 will then remain stationary until the r.p.m. increases to an extent sufficient to overcome the pre-loading of the low speed balance spring 90 whereon surface 65 of sleeve member 59 will engage sleeve 98 compressing intermediate speed balance spring 92 while surface 63 engages the operating arm of the intermediate speed microswitch 62 as it actuates the low speed microswitch 60. With increasing r.p.m. the sleeve 40 will likewise successively actuate the intermediate and high speed microswitches 62 and 64 as the preloading of their balance springs 92 and 94 is overcome.

It is apparent that the combined slidable mass of sleeve 40, bearing 55 and cam collar 59 is significant particularly in relation to the mass of flyweights 34. Engine induced vibrations axially of shaft 20 tend to shift this combined mass axially and to thereby modify the actuation of microswitches 60, 62 and 64.

Figure 2:
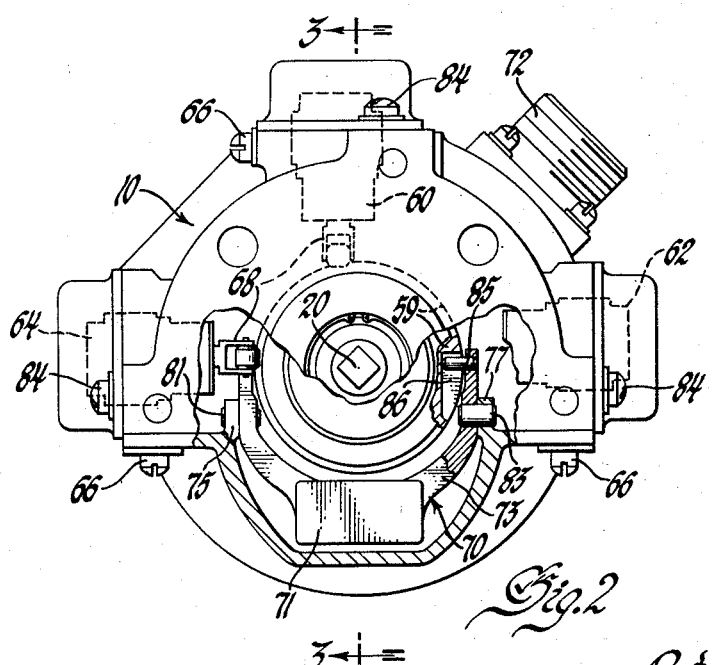
Figure 2 is a view along line 2—2 of Figure 1.
Figure 3:
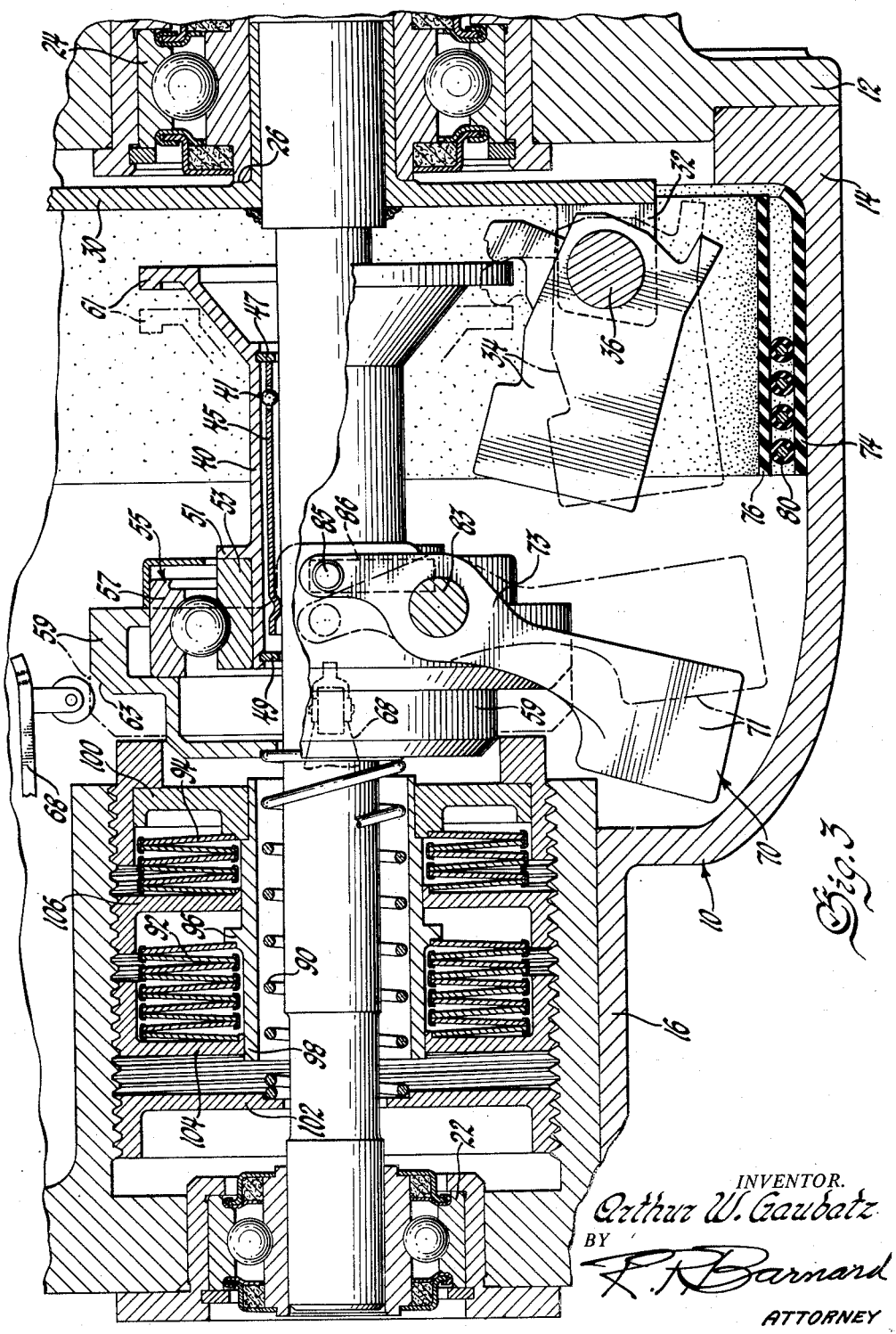
Figure 3 is a fragmentary enlargement of Figure 1 showing the invention in greater detail.

To obviate this difficulty of extraneous switch actuation a counterweight device indicated at 70 is provided. As best seen in Figure 2, device 70 includes a bifurcated lever 73 having a weighted portion 71 disposed between the lever legs. The legs of lever 73 are pivotally supported upon flange portions 75 and 77 of casing 14 through pins 81 and 83. The free ends of the legs of lever 73 are pivotally connected to cam collar 59 through pins 84. Pins 84 are disposed within circumferential slots 86 formed in collar 59. Slots 86 are of substantially the same width as the diameter of pins 84 but the added slot length permits non-binding action between the pins and slots.

It is to be noted that the axis of pins 85 intersects the axis of shaft 20. Further the axis of pins 81 and 83 is disposed below the shaft axis and parallel to the axis of pins 84.

The mass of lever portion 73 is such that its weight times its moment arm about pivot points 80—82 is substantially equal to the combined weights of sleeve 40, bearing 55 and cam collar 59 acting through pins 84 about the moment arm between pins 84 and 80—82. Thus any extraneous movement, engine vibration induced, of the switch actuating device 40, 55 and 59, is immediately offset by an equal and opposite movement of device 70. In this way the actuation of microswitches 60, 62 and 64 is solely under the control of flyweights 34 resulting in improved accuracy of operation of the speed switch mechanism.

It is apparent that various structural modifications are possible within the intended scope of the present invention as set forth in the hereinafter appended claims.

I claim:
1. A speed switch mechanism comprising a casing, a shaft rotatably mounted in said casing, a switch device, a sleeve coaxially mounted on and slidable relative to said shaft, flyweights mounted for rotation with said shaft and operatively engaging said sleeve, collar means mounted for axial movement with said sleeve and adapted to engage said switch device, and a lever pivotally mounted intermediate its ends to said casing, one end of said lever being pivotally connected to the collar means, the other end of said lever including a weighted portion corresponding in mass to that of the sleeve and collar means.

2. A speed switch mechanism as set forth in claim 1 in which the pivotal connection of said lever to said casing is disposed below the axis of said shaft.

3. A speed switch mechanism as set forth in claim 1 in which the pivotal connection of said lever to said casing and said weighted lever portion are disposed below the axis of said shaft.

4. A speed switch mechanism as set forth in claim 1 in which said lever is a bifurcated element including legs pivotally connected at their free ends to the collar means.

5. A speed switch mechanism as set forth in claim 4 in which the weighted lever portion is disposed between said legs and below the pivotal connection of said lever to said casing.

6. A switch actuating mechanism comprising a casing, a shaft rotatably mounted in said casing, a switch device, means movable axially of said shaft adapted to engage and actuate said device, means rotatable with said shaft and adapted to impart axial movement to the device actuating means, and a weighted device operatively connected to said casing and the device actuating means to offset axial vibrations tending to move the device actuating means, said weighted device being pivotally mounted on said casing on an axis transverse to and offset from the axis of said shaft and further which weighted device is pivotally connected to the device actuating means through an axis intersecting said shaft axis.

References Cited in the file of this patent
UNITED STATES PATENTS

| 1,127,012 | Kagi | Feb. 2, 1915 |
| 2,786,667 | Gaubatz | Mar. 26, 1957 |